UNITED STATES PATENT OFFICE.

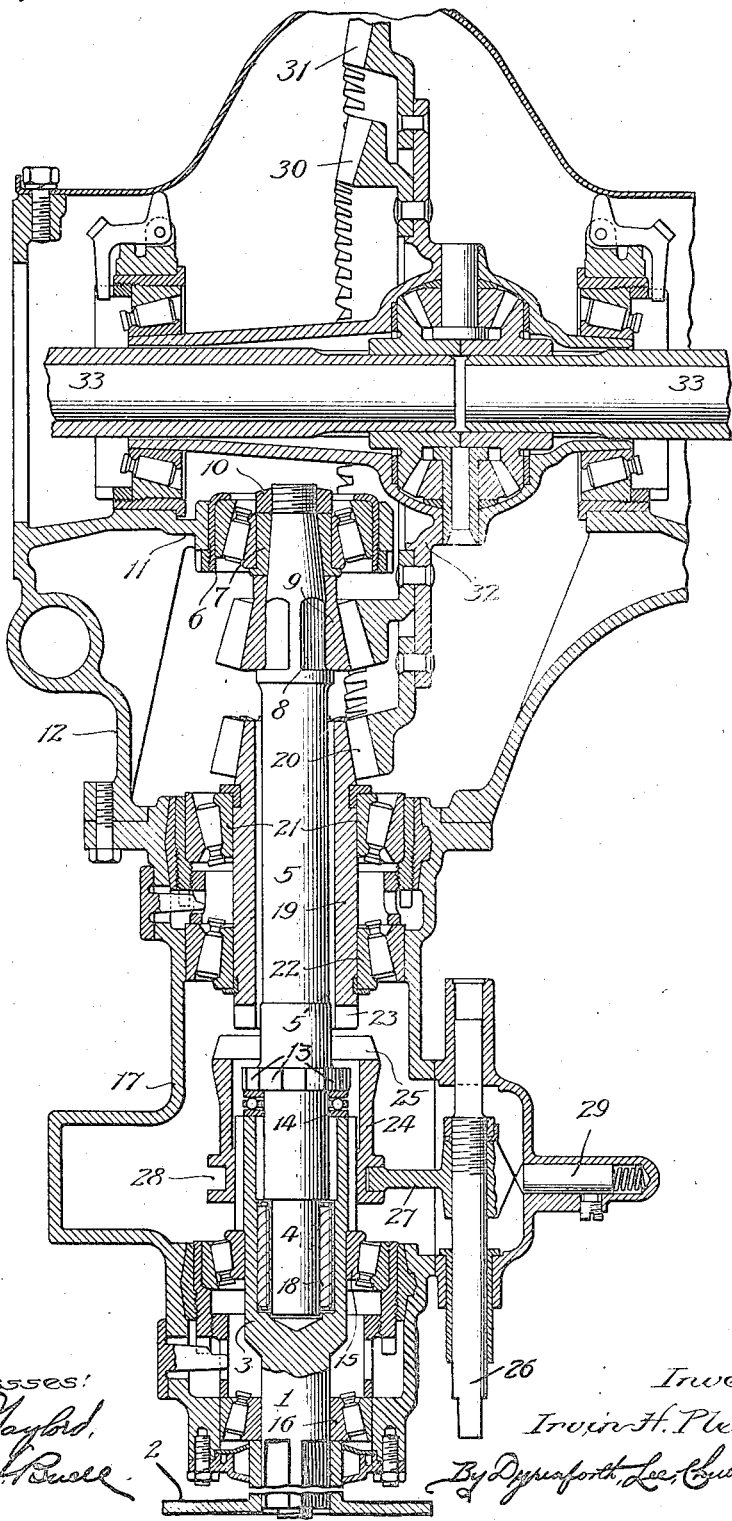

IRVIN H. PLEUKHARP, OF COLUMBUS, OHIO.

TRANSMISSION-GEARING.

1,229,782.   Specification of Letters Patent.   Patented June 12, 1917.

Application filed March 2, 1916. Serial No. 81,632.

*To all whom it may concern:*

Be it known that I, IRVIN H. PLUEKHARP, a citizen of the United States, residing at Columbus, in the county of Franklin and State of Ohio, have invented a new and useful Improvement in Transmission-Gearing, of which the following is a specification.

My invention relates to transmission gearing and more particularly to the type of reduction gearing used in connection with the rear axles or jack-shafts of vehicles propelled by internal combustion engines. The object of my invention is to provide a simple and practical combination of elements arranged to give selectively two different driving ratios. My present invention is especially concerned with the mechanical details of construction and arrangement of the parts by which I am able to obtain the broad results aimed at in such a way as to conform to the most exacting demands of automobile engineering practice.

The invention will be fully understood from the following detailed description, taken in connection with the accompanying drawing which illustrates in horizontal section a preferred embodiment of the invention.

In this drawing the numeral 1 identifies the primary driving member of my axle-transmission assembly, this member being designed to be connected with the vehicle propeller shaft as by a universal joint or coupling 2. The inner end of the driving member 1 is enlarged and centrally bored as shown at 3, to receive the reduced end 4 of the high-speed driving shaft 5.

The latter is journaled at its inner end in a combined radial and thrust bearing 6 which is sleeved upon a shouldered bush 7 which further serves as a spacer member to secure upon the squared shaft portion 8 a separate high-speed driving-pinion 9, a nut 10 threaded upon the inner end of the shaft holding the parts in assembled position. The bearing 6 is mounted in a web 11 which may be cast or forged integrally with the housing member 12 of the rear axle or jack-shaft.

Intermediate its length the shaft member 5 is slightly enlarged as at $5^1$ and at the outer end of this enlarged section there are formed radially extending clutch teeth 13. The outer faces of these teeth form a shoulder against which a thrust bearing 14 seats, transferring the outward thrust of the shaft 5 to the enlarged hollow end 3 of the primary driving member 1. The latter element is carried by a pair of opposed combined radial and thrust bearings 15, 16, mounted in the manner shown in a housing 17 which is designed to be bolted to the housing 12.

The bearing 15 lies in the plane of a bearing 18 interposed between the reduced extremity 4 of the drive-shaft 5 and the bore of the enlargement 3 of the primary driving member 1. By this arrangement of the parts the drive-shaft 5 is adequately supported from the housing by bearings at each end capable of taking both radial load and thrust.

Surrounding the intermediate portion of the drive-shaft 5 is the low-speed drive-sleeve 19, the internal bore of the sleeve being sufficient to permit it to be slipped on over the inner end of the drive-shaft before the pinion 9 is put on. The sleeve 19 has formed integrally thereon a low-speed driving-pinion 20, and for supporting the sleeve I provide a pair of opposed combined radial and thrust bearings 21, 22, mounted directly within the housing 17 as shown. The outer end of the sleeve carries axially extending clutch teeth 23 which lie over the shaft section $5^1$ and terminate some distance short of the drive-shaft clutch-teeth 13.

For transmitting power from the primary driving member 1 selectively to the drive-shaft 5 or sleeve 19, I provide a sliding clutch sleeve 24 splined to the enlargement 3 and having its inner overhanging end formed into radially and axially extending clutch teeth or jaws 25 of such depth that in the assembled position of the parts their inner radial faces bear upon and are supported by the shaft-section $5^1$. For shifting the clutch-sleeve 24 there is provided a slidable shifter rod 26 carrying an arm 27 the free end of which engages a groove 28 in the sleeve. A spring pressed plunger 29 operating against cam faces on the arm 27 serves to normally hold the clutch in either of its extreme shifted positions, as is well understood.

The high and low speed pinions 9 and 20 are arranged to mesh respectively with concentric ring gears 30, 31, carried by the flange of an annular differential housing member 32. The latter may be of the design shown in the drawing, and well understood in the art, acting to compensate for the varying relative speeds of the two axle drive members 33.

In the construction illustrated in the drawing the two driving ratios afforded are 4 to 1 and 5 to 1, the former ratio being obtained by a 5-pitch (diametral) pinion 9 having fourteen teeth meshing with a ring gear 30 of fifty-six teeth, and the latter ratio being obtained by a pinion 20 of fifteen teeth meshing with a ring gear 31 of seventy-five teeth.

While it is believed that the operation of my device will be sufficiently clear to those skilled in the art from the foregoing description of the construction of the same, it may be stated briefly that accordingly as the shifter rod 26 occupies the inner or outer position, the clutch teeth 25 will engage either the low-speed sleeve 19 or the high-speed shaft 5, each of these members being free of all driving connection with the primary drive member 1 when the other is engaged therewith. The axles 33 may therefore be driven at either of the desired speeds relative to the primary drive member or tail shaft 1 by movement of the shifter rod 26.

While I have shown and described in considerable detail one specific embodiment of my invention it is to be understood that such showing and description is illustrative only and for the purpose of making my invention more clear.

What I claim as new and desire to secure by Letters Patent is:—

1. In combination, a primary driving member having a central bore within its inner end, a high-speed drive-shaft in alinement therewith and having its outer end entering and bearing within the bore of the inner end of said primary driving member, clutch jaws formed on said high-speed drive-shaft adjacent its outer end, a relatively long low-speed sleeve surrounding the high-speed shaft and having clutch jaws formed in its outer end spaced from the jaws of the shaft, said sleeve being free of all connections with the said shaft, a pair of external bearings mounted on opposite ends of the sleeve for directly supporting the same, a bevel pinion carried by the inner end of the sleeve, a bevel pinion on the inner end of the shaft, concentric bevel gears mounted on a shaft at right-angles to the drive-shaft and meshing each with one of the said pinions, and an overhanging clutch member slidable upon the inner end of the primary driving member and having clutch jaws adapted to selectively engage with the jaws of the high-speed shaft or the low-speed sleeve.

2. In combination, a primary driving member having a central bore within its inner end, a high-speed drive-shaft in alinement therewith and having its outer end entering and bearing within the bore of the inner end of said primary driving member, an external bearing supporting the inner end of said primary driving member in the plane of the internal bearing of said high-speed drive shaft, a clutch member carried by said high speed drive shaft adjacent its outer end, a relatively long low-speed sleeve surrounding the high-speed shaft and having a clutch member on its outer end spaced from the clutch member of the shaft, said sleeve being free of all connections with the said shaft, a pair of external bearings mounted on opposite ends of the sleeve for directly supporting the same, a bevel pinion carried by the inner end of the sleeve, a bevel pinion on the inner end of the shaft, a bearing supporting the inner end of the shaft, concentric bevel gears mounted on a shaft at right-angles to the drive shaft and meshing each with one of the said pinions, and an overhanging clutch member slidable upon the inner end of the primary driving member and adapted to selectively engage with the clutch of the high-speed shaft or the low-speed sleeve.

IRVIN H. PLEUKHARP.

In presence of—
W. E. CAMPBELL,
E. L. KRANER.